COMBINED DATA ACCUMULATION REDUCTION SYSTEM

Filed June 30, 1966 4 Sheets-Sheet 1

ONE-TO-ONE QUENCH CORRECTION CURVE

*INVENTORS*
ROY E. NATHER
WALLACE L. KNUTE

BY T. E. Kristofferson

ATTORNEY

COMBINED DATA ACCUMULATION REDUCTION SYSTEM

Filed June 30, 1966 4 Sheets-Sheet 2

INVENTORS
ROY E. NATHER
WALLACE L. KNUTE
BY
T E Kristoffersen
ATTORNEY

INVENTORS
ROY E. NATHER
WALLACE L. KNUTE
BY
T.E. Kristofferson
ATTORNEY

COMBINED DATA ACCUMULATION REDUCTION SYSTEM

Filed June 30, 1966 4 Sheets-Sheet 4

INVENTORS
ROY E. NATHER
WALLACE L. KNUTE

BY T E Kristofferson
ATTORNEY 3,470,365

COMBINED DATA ACCUMULATION REDUCTION SYSTEM

Roy E. Nather and Wallace L. Knute, Solana Beach, Calif., assignors to Beckman Instruments, Inc., a corporation of California Filed June 30, 1966, Ser. No. 561,907
Int. Cl. G06f *7/38;* G06g *7/00*
U.S. Cl. 235—156 8 Claims

ABSTRACT OF THE DISCLOSURE

A system for computing the counts-per-minute for radiation analysis systems wherein the contents of a scaler is divided by the contents of the timer to present the quotient as the output. In order to enhance the system's data reduction capability, the timer is modified to automatically apply a correction factor to the counts-per-minute output.

This invention relates to a combined data accumulation reduction system for radiation analysis systems and, more particularly, to a system of time-base modification for automatic data reduction by correcting the data by a constant factor.

Radiation detection and measuring instruments frequently are designed with some limited data reduction capability but the usual moderate cost with respect to digital computers limits the hardware which may be added for this purpose. It is, therefore, particularly valuable to obtain maximum calculational capability by using, wherever possible, the data accumulation hardware which must be present to enhance the data reduction capability of the instrument. Such a radiation instrument may have the capability of providing an output in terms of counts-per-minute (c.p.m.), that is, it may have the ability to divide the contents of a scaler by the contents of a timer and present the quotient as an output. Such a system is disclosed in a copending patent application, Ser. No. 540,609, filed Apr. 6, 1966, by R. E. Nather and H. W. Georgi entitled "Radiation Detection System with Automatic Sample Counting Rate Determination," assigned to the assignee of the present invention.

While c.p.m. output is useful, further manual data reduction is almost always necessary before an experimenter can make use of the data. In the prior art such calculations have normally been carried on manually or external to the radiation measuring machine. If a single fixed factor could be included in the calculation internal to the machine, which fixed factor might be a combination of many individual correction factors such as quench, aliquot, chemical yield, etc., further data reduction would not be required in a very large number of cases. Prior art liquid scintillation counters, for example, usually have a method of quench calibration which provides a much needed correction factor. Such a method of quench calibration is described in a copending application, Ser. No. 480,034, filed Aug. 16, 1965 by R. E. Nather now Patent Number 3,381,130 entitled, "Method and Apparatus for Counting Standardization in Scintillation Spectrometry," and assigned to the assignee of the present invention.

The main purpose of the invention is to provide a simple system of time-base modification which adds little to the hardware normally required for data accumulation in a radiation analysis system and which can automatically apply a correction factor to the counts-per-minute output of such a system to further reduce the data.

This and other objects are achieved by providing a time-base modifier and digital control to modify the time-base for a system including a scaler for accumulating counts, a timer for accumulating time pulses, and means for dividing the content of the scaler by that of the timer.

The novel features which are believed to be characteristic of the invention are set forth with particularity in the appended claims. The invention and further objects and advantages thereof, can best be understood by reference to the following description and accompanying drawings in which:

Figure 4:
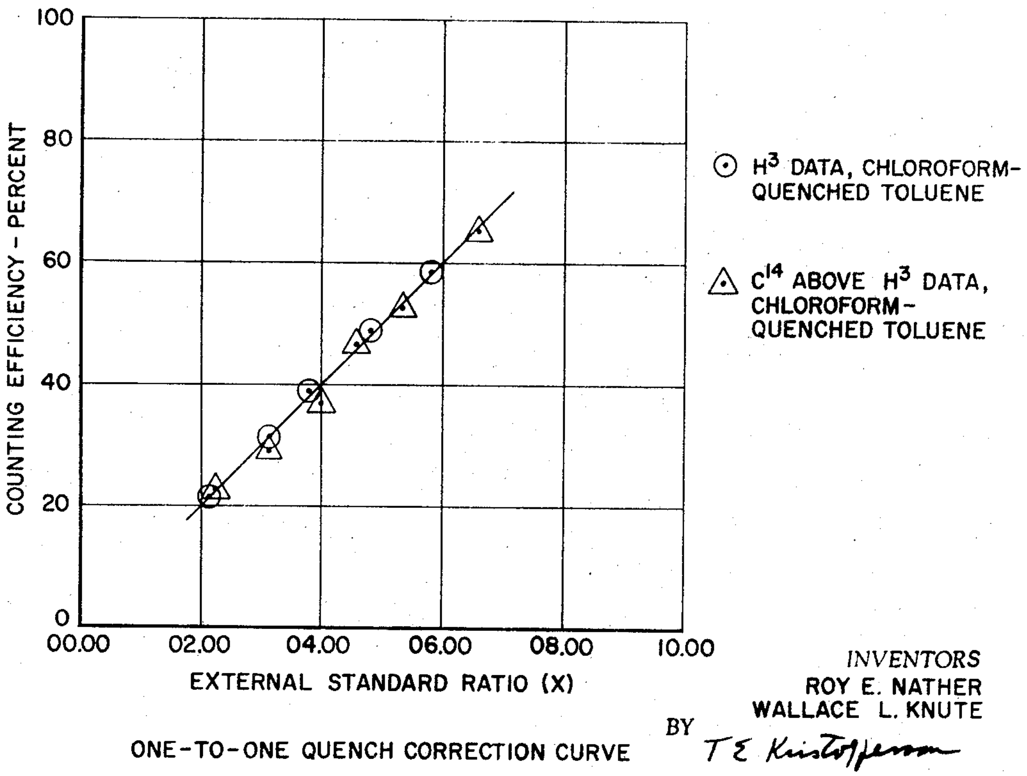
Figure 2:
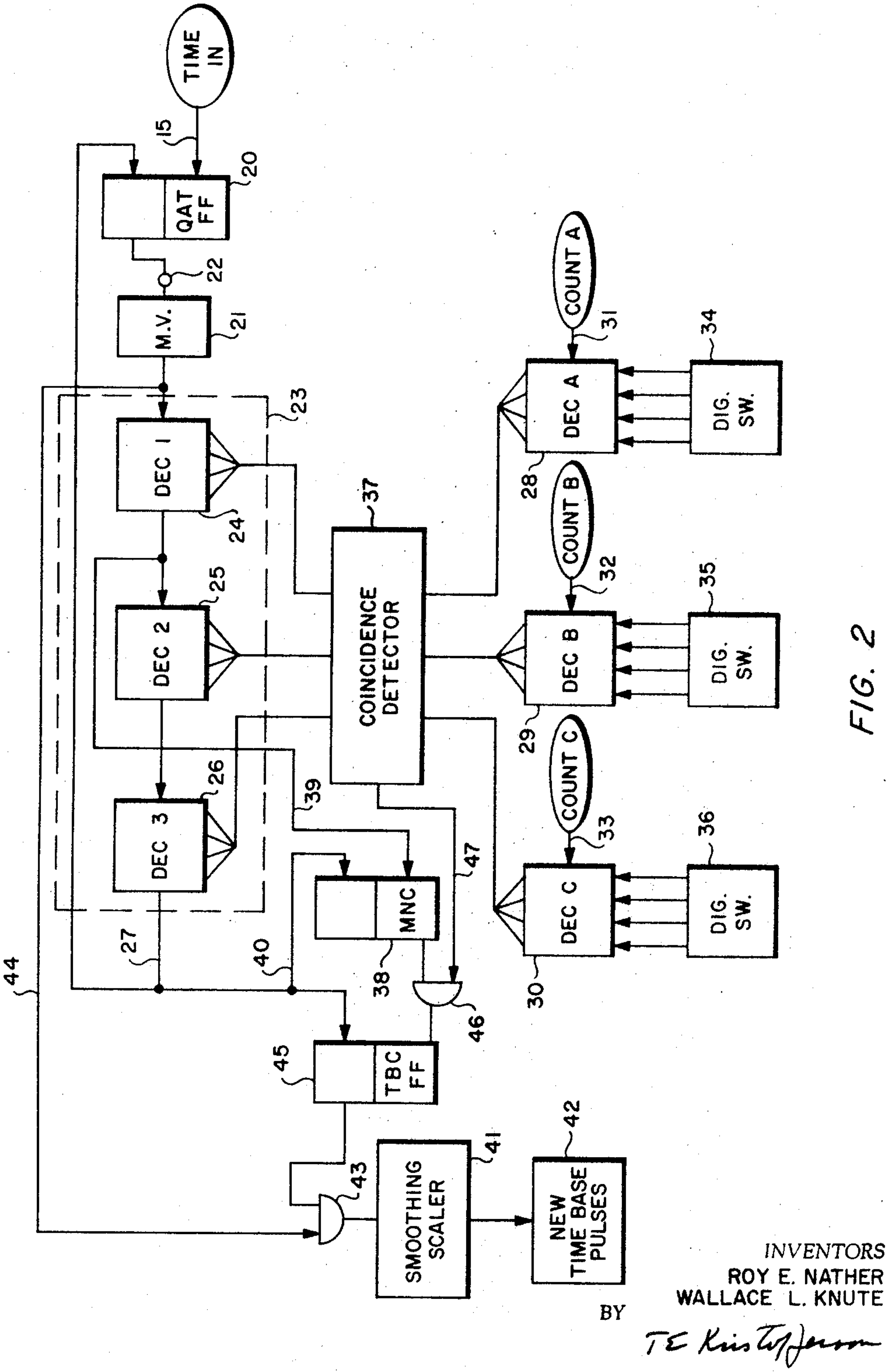
FIG. 2 is a more detailed block diagram of the time-base modifier and digital control illustrated in FIG. 1.

FIGS. 3*a*, 3*b*, 3*c* and 3*d* are a more detailed, logic diagram illustrating a clearing circuit; the scaler, coincidence detector and correction factor circuitry; the smoothing scaler; and associated interconnecting circuitry for a system such as illustrated in FIG. 2 respectively; and, FIG. 4 is a quenching correction factor curve for a system such as which may employ the subject invention.

Figure 1:
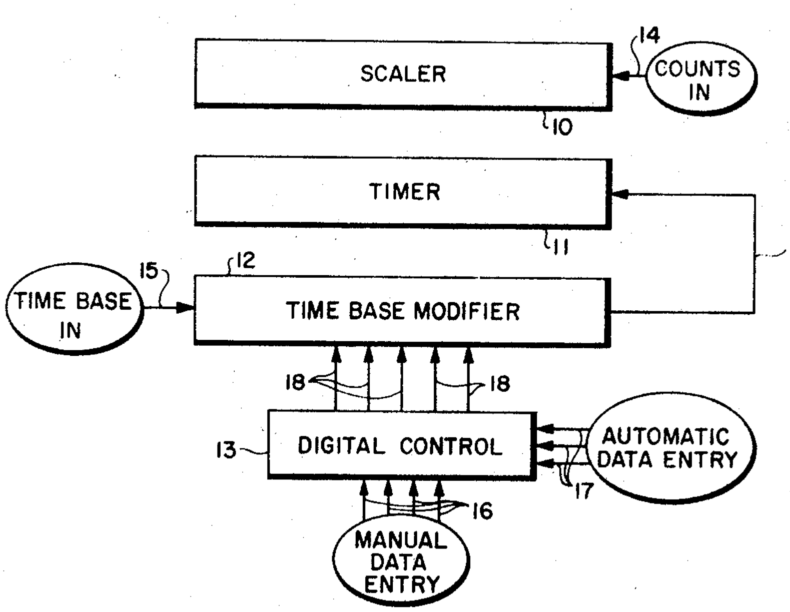
FIG. 1 is an over-all block diagram of the system incorporating the invention.

Turning now to the drawings, FIG. 1 shows, in block diagram form, the basic configuration of hardware to carry out the invention. A scaler 10 and timer 11 would normally be present in any radiation detection instrument. In addition, a time-base modifier 12 is provided with an associated digital control 13. The scaler 10 accumulates input pulses indicative of radioactive events coming from the input counts over the line 14. The timer 11 accumulates pulses coming from the time-base in input over line 15 to the time-base modifier 12. A correction factor is either set in to the digital control 13 by the manual data entry over lines 16, or automatically by the automatic data entry over lines 17, to provide the modification factor by which the time-base modifier 12 modifies the time-base of the input on line 15. The digital control 13 is connected to the time-base modifier 12 by the lines 18 and the time-base modifier 12 output is connected over line 19 to the timer 11. The associated instrument would have the usual capability of providing the output in c.p.m., that is, the ability to divide the contents of the scaler 10 by the contents of the timer 11 and present the quotient as an output, as described in the above referenced copending application, Ser. No. 540,609. The system outlined in FIG. 1 provides a capability of including an additional fixed factor in the calculation, which in many instances will eliminate the necessity for any further data reduction, both by means of including a single correction factor to be applied to a whole group of measurements from the manual data entry over lines 16, and a capability of automatically entering a correction factor such as may be obtained from a standardization or automatic calibration measurement over the lines 17. Naturally it would be necessary to perform the standardization step prior to taking the count on the sample in the event the correction factor is to come from the standardization step, which would modify the counting sequence frequently employed on prior art equipment.

The final result of the division of the scalers 10 and 11, counts per unit time, will be directly affected by any factor applied to either the dividend or the divisor. This system applies the correction factor by modifying the divisor, or the time-base. It is desired to correct for the detection efficiency and this is accomplished by modifying the time-base before it enters the timer register 11 so that the time-base frequency is reduced by precisely the correction factor required. If the correction factor is 0.332, for example, the time-base is reduced in frequency to 33.2% of its unmodified value. Analog methods might be applied for doing this, such as voltage controlled oscillators, but they are usually less stable than is required for this purpose and it is desired that the accuracy be limited to less than the uncertainty on the usual time-base, the 60-cycle line frequency.

FIG. 2 illustrates, in block diagram form, a digital factor time-base modifier for carrying out the functions of the time-base modifier 12 and digital controller 13, illustrated in FIG. 1, with the desired accuracy. The normal time-base input on line 15, using the same numeral as used in FIG. 1 where applicable, from a 60-cycle line turns on the switch "quit after a thousand" (QAT) (flip-flop 20). Flip-flop 20, in turn, enables a free running multivibrator 21 by means of removing the signal from the inhibit connection 22, which inhibits multivibrator 21 when the top half of the flip-flop 20 is true. The multivibrator 21 has a frequency adjusted to give greater than 1,000 output signals in the time between 60-cycle line signals, that is 16.667 milliseconds. It can be any type of oscillator. The pulses from multivibrator 21 are counted in a decade counter 23, which contains three decades 24, 25 and 26, to count 1,000 pulses. The thousandth pulse occurs on the output 27 of decade 26, which is connected back to the top side of the flip-flop 20 to cause it to be reset. Thus, exactly 1,000 pulses are generated for each time-base on the line 15.

Decades 28, 29 and 30 are three electronic decades provided to hold the correction factor to be applied. If only manual data entry is required, decade switches might be employed to replace the electronic decades 28–30 at a resulting cost saving. However, if automatic entry is required, their contents must be capable of being modified electronically as well as manually. Electronic modification can come by way of count A on line 31, count B on line 32 and count C on line 33 to the decades 28, 29 and 30, respectively. Alternatively, the contents of the decades 28, 29 and 30 can be modified manually by digital switches 34, 35 and 36, respectively. A coincidence detector 37 is connected between decades 28 and 24, decades 29 and 25, and decades 30 and 26 to compare their respective contents. A minimum number control switch (flip-flop 38) has its lower half connected to the output of decade 24 over the line 39 and its upper half connected to the output of decade 26, over the line 40. A smoothing scaler 41, having an output 42, new time-base pulses, is connected to the output of the multivibrator 21 through an "AND" gate 43 over line 44. The other input to the "AND" gate 43 comes from the top half of a time-base control flip-flop or switch 45, which is connected in turn to enable it from the output 27 of decade 26. The input of the bottom half of flip-flop 45 is connected through an "AND" gate 46 from the minimum number control flip-flop 38. The other input of "AND" gate 46 is enabled over the line 47 by a coincidence signal coming from the coincidence detector 37, in the event that the decades 24, 25 and 26 are all identical to the decades 28, 29 and 30.

At the start of the cycle, the flip-flops 20, 38 and 45 are all "off," that is, their lower halves are false. When a time-base pulse arrives over line 15, flip-flop 20 is set "true" and multivibrator pulses from multivibrator 21 enter decade 24 and are transmitted over line 44 through "AND" gate 43 to the smoothing scaler 41, since the other half of the "AND" gate 43 is enabled by the "true" signal on the top side of the multivibrator 45, opening the gate 43. After ten pulses have entered decade 24, a carry is generated which, in addition to being counted by decade 25, causes flip-flop 38 to be set "true" on its lower side. This opens the "AND" gate 46 into the flip-flop 45. It will be seen that this provides minimum number control for the correction factor. Correction factors less than 0.010 in this case will be ignored and no correction will be applied. Proper decoding would permit the use of any number as a minimum, or a manual switch might allow the operator to select any one of many available minima. The minimum number feature operates because the output pulse from the coincidence detector 37 over the line 47 will not get through the "AND" gate 46 unless the lower half of the flip-flop 38 is true and this wil not be the case until ten pulses are counted. Thus, if coincidence between the decades 28, 29 and 30, and the decades 24, 25 and 26 occurred prior to ten counts, no signal would go through "AND" gate 46 causing the lower half of flip-flop 45 to go "true" and shutting off the gate 43, preventing further counts from multivibrator 21 from going through gate 43 to smoothing scaler 41.

Assume the correction factor to be applied is 0.332. When 332 pulses have entered the decade 24, the three decades 24, 25 and 26 will show the numbers 332. Similarly, decades 28, 29 and 30 show the number 332. The coincidence detector 37 is designed to respond to just this coincidence of numbers. It provides an output only when the numbers in the two decade groups are exactly equal. This output turns on flip-flop 45 through "AND" gate 46 (since the minimum number has been exceeded) and the lower half of flip-flop 38 is "true" enabling gate 46. The output of the upper half of flip-flop 45 going "false" closes the gate 43 until the one-thousandth pulse arrives. The carry signal on line 27, on the occurrence of the thousandth pulse, serves to reset the flip-flops 20, 38 and 45, returning the circuit to its initial condition except that 332 pulses have been counted into the smoothing scaler 41 rather than 1000. Since the output of the scaler 41 provides the new time-base pulses, if it is a scale of 1,000, it will be seen that its input frequency is just 332 times 60, or 19,920 pulses per second, and its output frequency is 19.920 pulses per second whereas the original time-base was 60 times 1,000 or 60,000 pulses per second, and, with no correction applied, the output from scaler 41 would be 60,000 pulses per second.

There may be some time jitter present in the new time-base pulses appearing at output 42 due to the integer nature of the correction being applied and due to the bunching of pulses which enter the smoothing scaler 41. This jitter, however, can never be greater than the interval between 60-cycle line pulses. It can be seen that the c.p.m. resulting from dividing the accumulated counts by the modified contents of the timer register 11 of FIG. 1, which counts the time-base pulses coming from output 42, will result in the correction factor 0.332 being applied to the data. An equivalent logical scheme might employ the use of the coincidence output signal on line 47 to cause the reset of the decades 24, 25 and 26 as well as flip-flop 20, which would eliminate the need for the flip-flops 38 and 45. However, minimum number control would then be rendered more difficult. Where the accumulation time is required in addition to the modified data output, some auxiliary means is required to provide it.

Figure 3C:
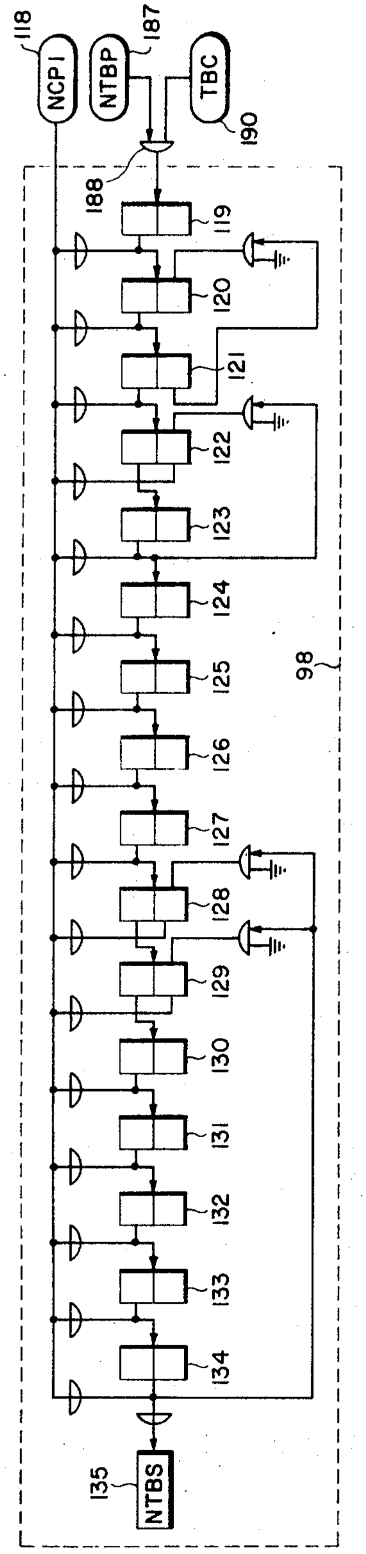
Figure 3D:
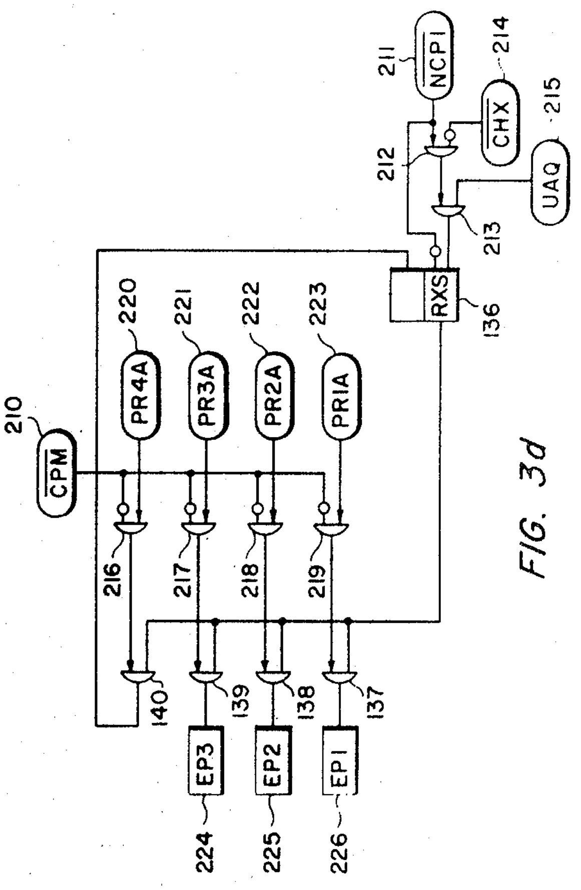
Figure 3A:
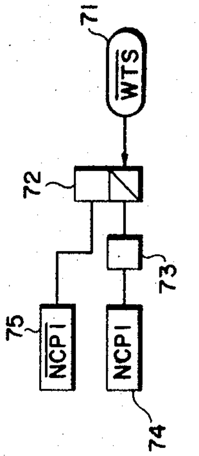
Figure 3B:
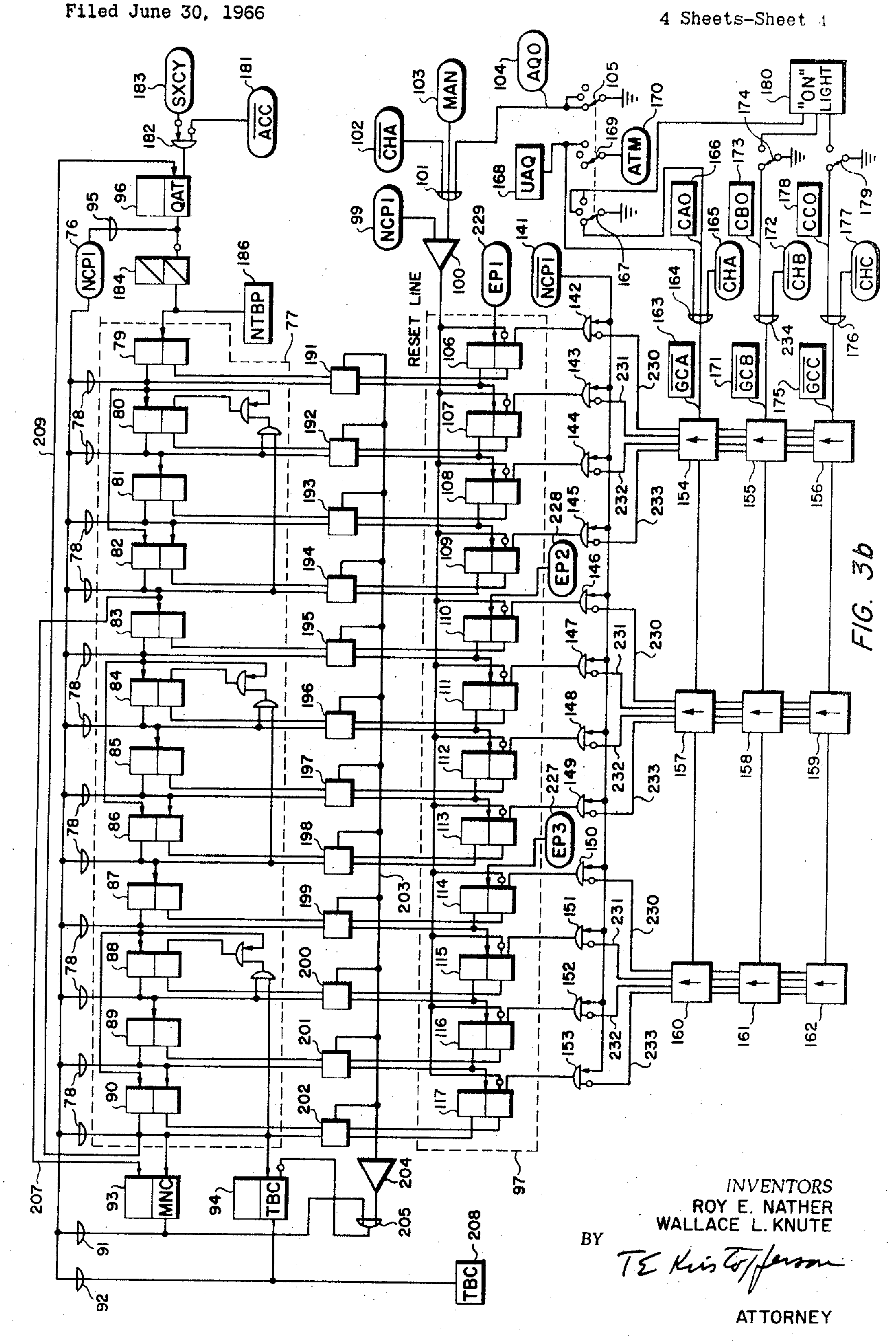

Referring now to FIGS. 3*a*, *b*, *c* and *d*, a more detailed embodiment of a preferred form of the invention is disclosed. In considering these figures, a bar over letters standing for a signal indicates the negative state; for instance, where TBC indicates "time-base control," $\overline{\text{TBC}}$ would indicate "time-base control not." Also, a small circle on an input lead, such as the inhibit 22 of FIG. 2, is indicative of a true inhibit or false enable connection. Signals contained in a rectangle are outputs and those contained in an oval are inputs. It should be noted that, in some cases, the details of this preferred embodiment differ from those previously described; in every case this results from utilizing circuitry which is *logically equivalent* to that previously described, for engineering reasons and for design convenience.

Before counting in any particular channel, $\overline{\text{WTS}}$–71 (wait to start not) signal goes true setting the monostable multivibrator 72 to its true state on is lower half, which signal goes through an emitter-follower 73 to generate a stronger true NCP1–74 (new clear print one) output. $\overline{\text{NCP1}}$–75 (new clear print one not) output then goes false. NCP1–74 output goes as an input NCP1–76 to the scaler 77, through decoupling diodes 78, to reset the flip-flops 79–90 to their zero state. Input 76 also goes through decoupling diodes 91 and 92 to set the flip-flop's MNC–93

(minimum number control) and TBC–94 (time-base control) to their one state and through a diode 95 to set flip-flop QAT–96 ("quit after a thousand") to its one state.

The circuitry also includes coincidence decades 97 and a smoothing scaler 98. NCP1 input 99 will provide a false output through "NAND" gate 100 as long as the second input soming from "OR" gate 101 is also true. This will be true at all times except when channel A is set for automatic quench, at which time the input $\overline{\text{CHA}}$–102 (channel A not) will be false, the input MAN–103 (manual mode) will be false and input AQO–104 (automatic quench off) is made false by switching the switch 105 to the right-hand position, not grounding the signal. The false output of "NAND" gate 100 will reset the flip-flops 106 through 117 in scaler 97 to their zero state through the false enable connections which force the one side of the flip-flop to the false state. The convention used throughout is that a D.C. connection to one side if a flip-flop with an inhibit indicated by a circle will force that side false for a false input.

The same output NCP1–74 is received as an input NCP1–118 to clear the flip-flops 199 through 134 in the smoothing scaler 98 by setting them to their appropriate states, to provide the proper division ratios such that the flip-flops 119 through 121 divide by 6, the flip-flops 122 and 123 divide by 3, the flip-flops 124 through 127 divide by 16 and the flip-flops 128 through 134 divide by 125. These division ratios are selected in order to receive one output NTBS–135 (new time-base signal) once for every 36,000 pulses received at the input to flip-flop 119. This number is derived as follows: The period of the original 60-cycle time-base is 16.667 milliseconds. This has, however, been divided down by 36 to get a time-base pulse every .01 minute or .6 second. The smoothing scaler factor will then be the ratio of the frequencies of the input to the output, or the ratio of the periods of the output to the input or $$\frac{\left(\dfrac{0.6\text{ seconds}}{16.666\text{ milliseconds}}\right)}{1000}$$

for example, when there is no correction factor since there are 1,000 pulses every 16,667 milliseconds. This reduces to $36\times10^3$.

Previously, when NCP1–74 went true, output $\overline{\text{NCP1}}$–75 went false, resetting RXS–136 (read external standard) flip-flop false in its lower side to disable "AND" gates 137 and 140. Next, the monostable flip-flop 72 will revert to its initial state after about 40 microseconds and the signal $\overline{\text{NCP1}}$–75 will go true. This signal is received as an input $\overline{\text{NCP1}}$–141 to enable "AND" gates 142 through 153 to allow them to set the information contained in the switches 154 through 162 into the flip-flops 106 through 117 in decades 97. Switches 154 through 162 constitute decimal-to-binary converters such that a decimal number dialed on their dial will be converted to the proper signal or signals on their 1, 2, 4 and 8 binary output lines 230–233, respectively. Such devices are well known in the art. The selection of the switches 154 through 162 to be read into decades 97 is determined in accordance with which particular channel is to be counted at the time and the mode in which channel A is to be counted.

In order for a particular set of switches such as 154, 157 and 160 to be on, the signal $\overline{\text{GCA}}$–163 (not gated channel A) must be false. This will occur only when the three inputs to the "OR" gate 164 are false. In other words, when the input $\overline{\text{CHA}}$–165 (not channel A) is false, indicating that channel A is to be counted, the input CAO–166 (channel A off) is false, that is, when the switch 167 is in its center or right-hand positions and when the signal UAQ–168 (used automatic quench) is false, which will be so as long as the switch 169 is not in its right-hand position and the ATM–170 (automatic mode signal) is true.

Switch 155, 158 and 161 will be actuated when $\overline{\text{GCB}}$–171 (not gated channel B) is false. This will be so when inputs to "AND" gate 234 $\overline{\text{CBH}}$–172 (not channel B) is false and CBO–173 (channel B off) is false, that is, when switch 174 is in its right-hand position.

Similarly, the switches 156, 159 and 162 will be actuated when the signal $\overline{\text{GCC}}$–175 (not gated channel C) is false, that is, when the signals into the "OR" gate 176 are false or when input $\overline{\text{CHC}}$–177 (not channel C) is false and the signal CCO–178 (channel C off) is false, that is, when switch 179 is in its right-hand position.

When any of the switches 167, 174 or 179 is in its right-hand position, the "on" light 180 will be actuated, indicating that the time-base in at least one of the channels is being corrected.

When the monostable flip-flop 72 went to its true state, input $\overline{\text{ACC}}$–181 (accumulate not) goes false, enabling "AND" gate 182. However, not until the next 60-cycle pulse from the 60-cycle time source (SXCY–183) occurs will we get an output from "AND" gate 182. Reversed logic is used (for engineering convenience) such that when the positive going input 183 on gate 182 occurs, the output of the gate 182 goes false, driving the output of flip-flop 96 in turn false and false-enabling the 80-kilocycle oscillator 184, causing it to commence oscillating and providing input pulses to the scaler 77 by applying pulses to the flip-flop 79. The pulses from flip-flop 184 also go by way of output NTBP–186 (new time-base pulse) and through input NTBP–187 to "AND" gate 188 and, in turn, to the input of flip-flop 119 as long as the "AND" gate 188 is enabled by the input TBC–190 (time-base control).

Counting continues in this manner until coincidence is established between the scalers 77 and 97. This is done by means of diode coincidence circuitry well known in the art and found in circuits 191 through 202. If any of the circuits 191 through 202 indicate a false condition, the line 203 will be clamped "false." When coincidence occurs, there will be no diode clamping the line 203 false and it will go true. The true signal on line 203 will then go through inverter 204 and appear as a false signal on one input of "OR" gate 205.

In order for the output of "OR" gate 205 to go false, and shut off flip-flop 94, the other input to "OR" gate 205 coming from the lower side of flip-flop 93 must also be false. This will not occur unless the input on line 207 coming from the output of flip-flop 82 has previously gone true on the tenth count, setting flip-flop 93 true on its top side. If coincidence occurs, setting line 203 true, before the output on line 207 has set flip-flop 93 true in its upper state, the output from the lower side of 93 will block the coincidence signal from going through the "OR" gate 205 and retain a true output TBC–208 (time-base control). Output 208 is connected to input TBC–190 in scaler 98 and until it goes false, the pulses on the output NTBP–186 are counted through input NTBP–187 into the smoothing scaler 98.

After TBC output 208 goes false, the scaler 77 continues to count until it has received 1,000 input pulses from the oscillator 184, at which time an output pulse from flip-flop 90 will go by way of line 209 to the lower side of flip-flop 96, setting it true and disabling oscillator 184. The same output signal from the top side of flip-flop 90 will serve to set MNC–93 true on its lower side and TBC–94 true on its lower side.

If the correction factor dialed into flip-flops 106 through 117 had been zero, coincidence would not be reached until 1,000 pulses had been counted into scaler 77 and output TBC–208 would remain true during the entire time. The next input from the 60-cycle source, at input 183, will serve to repeat the foregoing procedure.

The embodiment illustrated is provided wtih circuitry for applying an automatic quench to correct the time-base for channel A. Obviously, this could be done for all three channels but if it were to be done it would be necessary to obtain a standard count in each channel before counting the channels and to provide the necessary external standard energy windows to do this for each of the channels. The automatic quench ratio may be derived in the manner described in the above referenced application Ser. No. 480,034. The quenching correction factor curve shown in FIG. 4 demonstrates how it is possible, by proper adjustment of the external standard windows, to obtain a linear, one-to-one relationship (within about ±5%) between observed counting efficiency and observed external standard ratio, over a wide range of apparent counting efficiencies. With such a linear, one-to-one relationship between counting efficiency and the external standard ratio, division of CPM by the external standard ratio gives DPM directly for samples of varying quench:

$$DPM=\frac{CPM}{E_T}=\frac{CPM}{X}$$

If the correction factor to be applied to channel A is to be that derived from the automatic quench, then switches 167, 169 and 105, which are ganged together, are all in their right-hand position. This results in a true signal $\overline{GCA}$–163, which will not permit the switches 154, 157 and 160 to be read into flip-flops 106 through 117. In place of this, as we go into the external standard channel, the output NCP1–74 of monostable flip-flop 72 resets the flip-flops 106 through 117 and output $\overline{NCPI}$–75 insures that "AND" gates 137–140 are disabled through flip-flop 136. When the monostable flip-flop 72 returns to its stable state, after approximately 40 milliseconds with its upper half true, the output 75 appears as true input $\overline{NCPI}$–211 which will go through "AND" gates 212 and 213 because input $\overline{CHX}$–214 (channel X not) is false, false-enabling "AND" gate 212 and input UAQ–215 (use automatic quench) is true, enabling the "AND" gate 213. Flip-flop 136 then goes true in its lower side enabling "AND" gates 137 through 140, which are then waiting for the "printer advance" pulses which occur during the time that the division is taking place in the external standard step.

During the dividing process, the gates 216 through 219 are false enabled by the input $\overline{CPM}$–210 (not counts per minute) being false and the pulses coming from the dividing process PR4A–220 (printer 4 advance), PR3A–221 (printer 3 advance), PR2A–22 (printer 2 advance) and PR1A–223 (printer 1 advance) go through the gates 216 through 219 respectively. If a pulse occurs on PR4A–220, this will go through gate 216 and, in turn, through gate 140 and return to the top side of flip-flop 136, shutting it off and preventing pulses from going through "AND" gates 217 to 219 and in turn, through gates 139, 138 and 137 to the output EP3–224 (entry point 3), EP2–225 (entry point 2) and EP1–226 (entry point 1), and, in turn, to the inputs on decades 97, EP3, EP2 and EP1, 227 through 229, respectively.

This will insure that a zero is in the decades 97 in the event a pulse is received on PR–4 input 220, since this would indicate more than 100% counting efficiency, an impossible condition. In the absence of a pulse on input 220, the pulses on inputs 221 through 223 will be passed through the "AND" gates and appear as outputs 224 through 226 and inputs 227 through 229, storing the correction factor computed in the flip-flops 106 through 117.

At the end of the external standard step, since we are in automatic quench, the inputs 102 through 104 to "OR" gate 101 will all be false, disabling "NAND" gate 100, preventing a reset from its output. This leaves the external standardization ratio recorded in the flip-flops 106 through 117 for coincidence purposes in connection with counting channel A, which is the next channel in the counting sequence.

Since the principles of the invention have now been made clear, modifications which are particularly adapted for specific situations without departing from those principles will be apparent to those skilled in the art.

What is claimed is:

1. In a data accumulation reduction system for automatic radioactivity counting equipment including a first register for accumulating a count of radioactive events, a source of time base pulses, a second register for accumulating a count of elapsed time and means for dividing the contents of the first register by that of the second register to derive an output in the units of events per unit time the improvement comprising;

a time-base modifier having an input connected to receive said time-base pulses and an output connected to the input of said second register; and, digital control means connected to said modifier for controlling said time-base modifier to inhibit it to permit it to pass only a fixed percentage of said time-base pulses to said second register.

2. The system of claim 1 including means for adjusting said digital control means to adjust said fixed percentage.

3. The system of claim 2 in which said means for adjusting includes both manual and automatic means.

4. The system of claim 2 including minimum number control means for preventing said inhibit if said fixed percentage is below a second fixed percentage.

5. The system of claim 1 in which said time-base modifier includes;

a scaler having a first plurality of decades;

a second plurality of decades of like number as said first plurality for storing information representing said fixed percentage;

a coincidence detector for providing a coincidence output when the contents of said first and second plurality of decades are equal;

a smoothing scaler;

a local oscillator having an output connected to the input of said scaler and through a first gate to the input of said smoothing scaler;

a first switch for turning said local oscillator on and off;

a second switch for turning said first gate on and off;

means for actuating said first switch to turn said oscillator on, on the occurrence of a time pulse after actuating said second switch to open said first gate;

means connecting said coincidence output to said second switch to close said first gate; and means connecting the carry pulse from the last decade of said scaler to actuate said first switch to shut off said oscillator.

6. The system of claim 5 including;

a third minimum number control switch;

a second gate connected between said coincidence detector and said second switch;

means for actuating said third switch to close said second gate upon said actuating of said second switch to open said first gate;

means connecting said third switch between a point on said scaler representing a minimum number and said second gate for opening said second gate on the occurrence of said minimum number to permit said second gate to pass said coincidence output to said second switch to close said first gate when said coincidence pulse occurs after said minimum number; and, means connecting said carry pulse to activate said third switch to close said second gate.

7. The system of claim 6 in which said digital control means includes;

a plurality of digital switches, one for each of said second plurality of decades and for each channel to be counted; and, means for actuating said digital switches associated with a channel to be counted to read their contents into said second plurality of decades.

8. The system of claim 7 including means for automatically entering a quench ratio into said second plurality of decades and for disabling all of said digital switches during a quench count on a given channel and for preventing the resetting of said plurality of decades prior to a subsequent sample count on said given channel to permit said quench ratio to be used for coincidence purposes.

References Cited

UNITED STATES PATENTS 3,246,150 4/1966 Stoddart et al. ---- 250—83.6 X
3,381,130 4/1968 Nather ------------ 250—71.5

EUGENE G. BOTZ, Primary Examiner

U.S. Cl. X.R.

250—71.5; 235—92